United States Patent
Kawahara

(10) Patent No.: US 6,441,372 B1
(45) Date of Patent: Aug. 27, 2002

(54) INFRARED FOCAL PLANE ARRAY DETECTOR AND METHOD OF PRODUCING THE SAME

(75) Inventor: Akihiro Kawahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/411,366

(22) Filed: Oct. 4, 1999

(30) Foreign Application Priority Data

Oct. 5, 1998 (JP) .......................................... 10-282860

(51) Int. Cl.$^7$ ................................................ G01J 5/24
(52) U.S. Cl. .................................... 250/332; 250/338.1
(58) Field of Search .............................. 250/332, 338.1, 250/338.4

(56) References Cited

U.S. PATENT DOCUMENTS

| | | | | |
|---|---|---|---|---|
| 5,757,008 A | * | 5/1998 | Akagawa et al. | 250/370.08 |
| 6,048,092 A | * | 4/2000 | Kimura et al. | 374/129 |

FOREIGN PATENT DOCUMENTS

| | | |
|---|---|---|
| JP | 05-52659 A | 3/1993 |
| JP | 06-34448 A | 2/1994 |
| JP | 7-306090 A | 11/1995 |
| JP | 07-318430 A | 12/1995 |
| JP | 08-68700 A | 3/1996 |
| JP | 08-105794 A | 4/1996 |
| JP | 08-201166 A | 8/1996 |
| JP | 8-334413 A | 12/1996 |
| JP | 09-168116 A | 6/1997 |
| JP | 09-264792 A | 10/1997 |
| JP | 9-325073 A | 12/1997 |
| JP | 10-26556 A | 1/1998 |
| JP | 10-38677 A | 2/1998 |
| JP | 10-38686 A | 2/1998 |

* cited by examiner

Primary Examiner—Constantine Hannaher
(74) Attorney, Agent, or Firm—Sughrue Mion, PLLC

(57) ABSTRACT

A new infrared focal plane array detector which removes an offset in output signal therefrom and eliminates an influence of a temperature drift thereby to augment the accuracy in detection of infrared rays and a method of producing the infrared focal plane array detector are provided. The infrared focal plane array detector includes three kinds of bolometer detectors including first bolometer detectors 101 serving as light reception elements having a thermal isolation structure from a substrate and disposed in a two-dimensional array, second bolometer detectors 102 having a thermal isolation structure from the substrate but provided with a light interception mechanism so that they may not receive infrared rays, and third bolometer detectors 103 having no thermal isolation structure from the substrate. A bridge circuit is formed by an arbitrary combination of four bolometer detectors of the three kinds addressed by two shift registers 109, 110. Each bolometer detector is connected at one of a pair of electrode terminals thereof to an input terminal of a differential amplifier such that midpoint potentials of the bridge circuit may be inputted to the differential amplifier.

15 Claims, 4 Drawing Sheets

INFRARED FOCAL PLANE ARRAY DETECTOR AND METHOD OF PRODUCING THE SAME

BACKGROUND OF THE INVENTION

1. Field of the Invention

This invention relates to an infrared focal plane array detector and a method of producing the same, and more particularly to an infrared focal plane array detector which is less likely to be influenced by an offset signal and a temperature drift and a method of producing the same.

2. Description of the Related Art

A bolometer detector has a resistance value which varies in response to a temperature variation, and is used widely for detection of infrared rays with the characteristic made most of. A mechanism of operation of a conventional infrared focal plane array detector which employs a bolometer detector and is an example of an application is described with reference to FIG. 1.

A plurality of unit cells 400 each including one bolometer detector 401 are arranged in a two-dimensional array in FPA (FOCAL PLANE ARRAY) 417 such that they may form columns and rows. Bolometer detector 401 in each unit cell 400 is connected to ground terminal 403 through unit cell selecting transistor or switch 402. The gate electrodes of unit cell selecting switches 402 are controlled by vertical shift register 410 through horizontal lines 406 and are selected such that all of the unit cell selecting switches 402 connected to one horizontal lines 406 may be put into a closed state. Consequently, on each vertical line 404, bolometer detector 401 on one of the unit cells 400 is selectively connected to ground terminal 403.

Vertical lines 404 are connected to an on-chip amplifier 407 through vertical line selection switches 405 and over to output line 421. Vertical line selection switches 405 are controlled by horizontal shift register 409 such that one of vertical lines 404 may be connected to an on-chip amplifier 407 at a given time.

A light receiver of each bolometer detector 401 is in a high thermally insulating state with respect to asubstrate, and consequently, thermal energy by infrared radiation is temporarily stored into bolometer detector 401. As a result, the temperature of bolometer detector 401 rises, and a resistance variation corresponding to the temperature variation appears with bolometer detector 401. Temperature information of an image pickup object can be obtained by externally reading out the resistance variation through output terminal 408.

For the readout circuit, for example, integration circuit 440 is used. In integration circuit 440, electric current flowing through integration transistor 441 while a fixed voltage is applied to bolometer detector 401 for a fixed time is integrated by means of integrating capacitor 442. Actually, integrating capacitor 442 connected in series to bolometer detector 401 is charged up to a predetermined voltage in advance, and then, after integrating capacitor 442 is energized with the fixed voltage for a fixed time, the remaining voltage of integrating capacitor 442 is read out. Integration transistor 441 acts to keep the voltage of output terminal 408 fixed even if the terminal voltage of integrating capacitor 442 varies during the integration operation. Accordingly, the remaining voltage of integrating capacitor 442 after the integration operation comes to an end depends upon the resistance value of bolometer detector 401 within the integration period and includes information regarding the amount of heat radiation received from the image pickup object. Information of the infrared radiation amount can be read out electrically in this manner.

The infrared focal plane array detector which employs a bolometer element described above, however, has a problem in that offset components of the output signal are so high that a sufficient gain cannot be obtained. A principal part of the offset components of the signal arises from a large variation of the bolometer resistance by a temperature rise caused by joule heating of the bolometer detector within the integration period. Although the offset components occupy the greater part of the output signal, it does not include temperature information of the object at all. Therefore, the dynamic range of an amplifier cannot be used effectively, and the signal gain cannot be raised. If the integration time is increased, then the temperature resolution is augmented as much. However, since this increases also the offset amount simultaneously, a sufficient integration time cannot be assured.

The infrared focal plane array detector which employs a bolometer described above has another significant problem in temperature drift. Although each bolometer detector is thermally isolated from the substrate, actually a little heat exchange with the substrate is present through signal readout wires. Therefore, if the ambient temperature varies and the substrate temperature varies, then the element temperature of the bolometer detector varies with a long time constant. This makes a cause of a temperature drift. In order to prevent this, FPN (FIXED PATTERN NOISE) correction must be performed frequently during operation, and this significantly deteriorates the operability of an infrared camera which employs the infrared detector.

SUMMARY OF THE INVENTION

It is an object of the present invention to provide a new infrared focal plane array detector which eliminates the drawbacks of the prior art described above and particularly removes an offset and eliminates an influence of a temperature drift thereby to augment the accuracy in detection of infrared rays and a method of producing the infrared focal plane array detector.

An-infrared focal plane array detector of the present invention comprises first bolometer detectors and at least one set of second bolometer detectors and a plurality of third bolometer detectors being provided on the same substrate. First bolometer detectors have, between the first bolometer detectors and a substrate, a thermal isolation structure for thermally isolating the first bolometer detectors and the substrate from each other and disposed in an infrared detection area on the substrate for receiving infrared rays incoming thereto. Second bolometer detectors have a thermal isolation structure between the second bolometer detectors and the substrate for thermally isolating the second bolometer detectors from the substrate and are so structured as to receive no infrared rays incoming to the infrared focal plane array detector. Third bolometer detectors are directly formed on the substrate. The bolometer detectors forming a circuit for removing an offset in output signals therefrom and reducing a temperature drift thereof.

Preferably, an arbitrary one of the first bolometers disposed in the infrared detection area and one of the third bolometer detectors disposed on the same column as the first bolometer detector are connected to each other at a first junction, and one of the second bolometer detectors disposed on the same row as the first bolometer detector and another one of the third bolometer detectors disposed on the same column as the second bolometer detector and different from the third bolometer detector are connected to each other at a second junction, and further, a bridge circuit is formed from the four bolometer detectors and the first junction and the second junction form midpoints for detecting a difference in voltage of the bridge circuit. Alternatively, the infrared focal plane array detector may be constructed such that an arbitrary one of the first bolometer detectors disposed in the infrared detection area is connected to one of the second bolometer detectors disposed on the same column as the first bolometer detector, and one of the third bolometer detectors disposed on the same row as the first bolometer detector is connected to another one of the third bolometer detectors disposed on the same column as the third bolometer detector, and further, a bridge circuit is formed from the four bolometer detectors and a junction between the first bolometer detector and the second bolometer detector and another junction between the two third bolometer detectors form midpoints for detecting a difference in voltage of the bridge circuit.

The infrared focal plane array detector may be constructed such that the infrared focal plane array detector includes a plurality of the second bolometer detectors, and plurality of switching element is provided for selectively using one of the plurality of second bolometer detectors in the bridge circuit, or such that the infrared focal plane array detector includes a plurality of the third bolometer detectors, and plurality of switching elements is provided for selectively using one of the plurality of third bolometer detectors in the bridge circuit.

Infrared ray interception means for the second bolometer detectors may be an infrared ray interception layer provided on an infrared ray incoming side of the second bolometer detector or may alternatively be an infrared ray reflection film provided on the second bolometer detectors on the substrate.

A switching transistor for selecting the first bolometer detectors and a differential amplifier for detecting a potential difference between the midpoints of the bridge circuit may be formed on the substrate on which the bolometer detectors are formed.

A method of producing an infrared focal plane array detector of the present invention comprises a first step of forming switching transistors for selecting bolometer detectors on a substrate, a second step of forming a sacrificial layer on the substrate, a third step of forming a film made of a bolometer material and a protective film on the sacrificial layer such that the film may be held between the protective film, a fourth step of etching the film made of the bolometer material into a predetermined shape and covering the film with the protective film, a fifth step of forming, in accordance with an application of the bolometer detectors, an infrared ray absorption film for the first bolometer detectors and the third bolometer detectors or one of an infrared ray reflection film and a light interception film for the second bolometer detectors on the protective film and patterning the infrared absorption film, infrared reflection film or light interception film into a predetermined shape, a sixth step of removing the sacrificial layer except that at a predetermined location including the third bolometer detectors to form a space, and a seventh step of containing the space under a vacuum state.

Preferably, three kinds of bolometer detectors are produced from the same material by the same process. The first step may include formation of a differential amplifier to which midpoint potentials of a bridge circuit formed from the three kinds of bolometer detectors are inputted.

By employing the structure described above, an influence of a temperature drift can be eliminated, and an offset component arising from a dispersion in in-plane characteristic of the bolometers and an offset component arising from joule heat generation upon signal reading out can be removed. Consequently, an infrared focal plane array detector which allows detection of infrared rays with a high degree of accuracy and is suitable for an infrared camera can be provided.

The above and other objects, features and advantages of the present invention will become apparent from the following descriptions based on the accompanying drawings which illustrate an example of a preferred embodiment of the present invention.

DETAILED DESCRIPTION OF THE PREFERRED EMBODIMENTS

An embodiment of an infrared focal plane array detector of the present invention will be described. Bolometer detectors which individually form pixels of the infrared focal plane array detector of the present embodiment have a shape similar to that of conventional bolometer detectors and include three kinds of bolometer detectors including first bolometer detectors serving as light reception elements having a thermal isolation structure from a substrate and disposed two-dimensionally, second bolometer detectors having a thermal isolation structure from the substrate but provided with a light interception mechanism so that they may not receive infrared rays, and third bolometer detectors having no thermal isolation structure from the substrate. A bridge circuit is formed by an arbitrary combination of four bolometer detectors of the three kinds addressed by two shift registers. Each bolometer detector is connected at one of a pair of electrode terminals thereof to an input terminal of a differential amplifier such that midpoint potentials of the bridge circuit may be inputted to the differential amplifier.

The bolometer detectors are formed in the same conditions by the same process so that the identical characteristics of them such as a resistance temperature coefficient and a thermal conductivity are identical among them. Therefore, a differential signal between the midpoint potentials of the bridge circuit does not include offset components arising from heat generation of the bolometer elements by background radiation or joule heat generation of the bolometer elements because the offset components completely cancel each other. Consequently, an infrared signal can be detected with a very high S/N ratio. Further, since a variation of the bolometer resistance by a temperature variation of the substrate occurs equally with all of the bolometer detectors connected to the midpoints of the bridge circuit, the temperature drift can be reduced.

Figure 1:
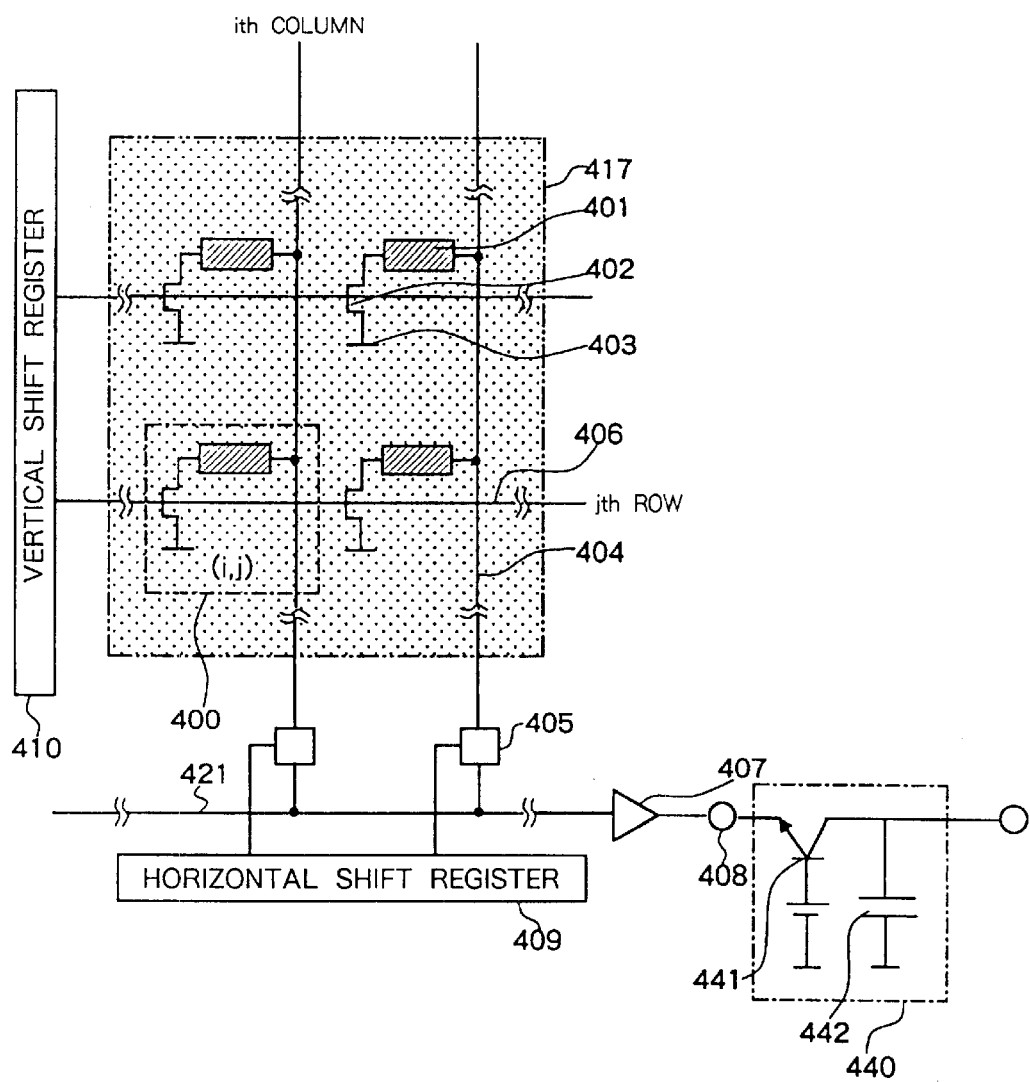
FIG. 1 is a schematic diagrammatic view of a conventional infrared focal plane array detector.
Figure 2:
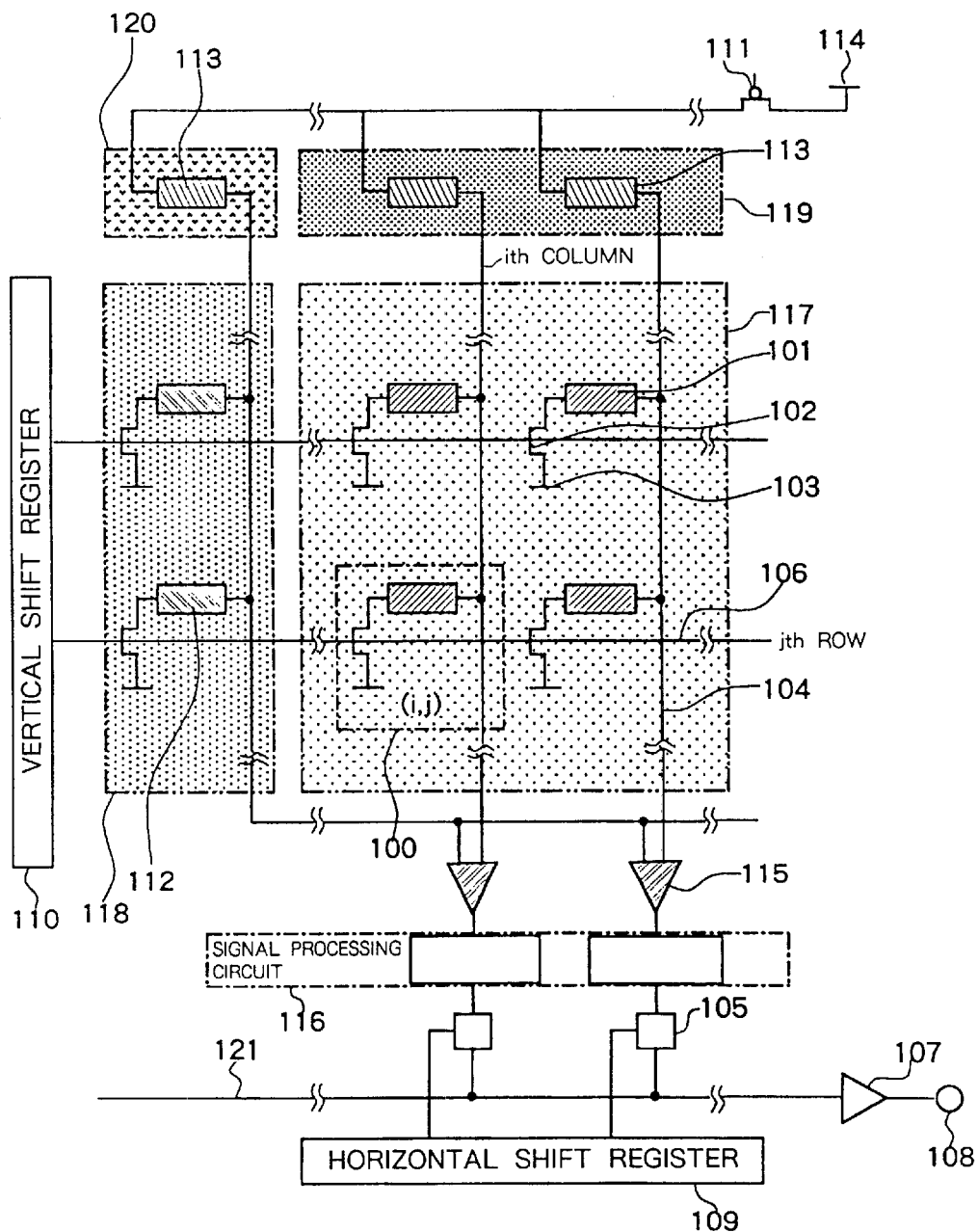
FIG. 2 is a schematic diagrammatic view of an infrared focal plane array detector of the present invention.

In the following, a detailed example of the infrared focal plane array detector of the present invention and a method of producing the same will be described in detail with reference to the drawings. FIG. 2 is a conceptual presentation of the infrared focal plane array detector of the present invention.

Referring to FIG. 2, FPA (Focal Plane Array) 117 indicates an infrared detection area and has m×n unit cells 100 disposed in a two-dimensional array therein. In FIG. 2, 2×2 unit cells are shown for simplified illustration. Each unit cell 100 is formed from first bolometer detecto[00f8] 101, unit cell selection switch 102, ground terminal 103, and two lines extending through first unit cell 100, i.e., vertical line 104 and horizontal line 106. First bolometer detector 101 formed on a substrate is so structured that it is thermally isolated from the substrate, for example, by means of a vacuum space.

Around FPA 117, three bolometer detector groups composed of bolometer detectors serving as reference elements of a bridge circuit, i.e., first reference element region 118, second reference element region 119 and third reference element region 120, are disposed in the proximity of FPA 117 on the same substrate.

First reference element region 118 includes n second bolometer detectors 112 arranged in a vertical column and n unit cell selection switches 102 corresponding to second bolometer detectors 112. Second reference element region 119 includes third bolometer detectors 113 disposed in a horizontal row. Third reference element region 120 includes a single third bolometer detector 113.

The two kinds of bolometer detectors which form the three regions, i.e., second bolometer detectors 112 and third bolometer detectors 113, are different in the following points from first bolometer detectors 101 which form FPA 117. In particular, second bolometer detectors 112 are different from first bolometer detectors 101 in that they have a structure for intercepting incoming infrared rays, and third bolometer detectors 113 are different from first bolometer detectors 101 in that they are held in thermal contact with the substrate. The structures other than those described above and the production methods of second bolometer detectors 112 and third bolometer detectors 113 are the quite same as those of first bolometer detectors 101. Detailed structures of the bolometer detectors will be hereinafter described in detail with reference to process sectional views.

Next, a reading out method of an output signal of the infrared focal plane array detector will be described in detail. Infrared signals incoming to m×n first bolometer detectors 101 which form FPA region 117 are successively selected by the two kinds of switching elements controlled by horizontal shift register 109 and vertical shift register 110, i.e., unit cell selection switches 102 and vertical line selection switches 105, so that all of the infrared signals are successively read out from m×n first bolometer detectors 101.

First, one of horizontal lines 106 is selected at a given time with a signal from vertical shift register 110. For example, if horizontal line 106 of the jth row is selected, then all of unit cell selection switches 102 in unit cells 100 positioned in the jth row in FPA 117 exhibit a closed state. If power supply switch 111 is closed then, then first bolometer detector 101 in the jth row and third bolometer detector 113 in second reference element region 119 positioned in the same column are connected in series to each other between power supply terminal 114 and ground terminal 103, and a midpoint potential between first bolometer detector 101 and third bolometer detector 113 is applied to one of a pair of input terminals of differential amplifier 115.

Simultaneously, a midpoint potential between third bolometer detector 113 in third reference element region 120 and second bolometer detectors 112 in the jth row in first reference element region 118 which are connected in series between power supply terminal 114 and ground terminal 103 is applied to the other input terminal of differential amplifier 115. In this manner, a potential difference between the two midpoint potentials is inputted to signal processor 116. Then, horizontal shift register 109 successively closes vertical line selection switches 105 of the individual columns so that the infrared signals of m first bolometer detectors 101 disposed in the jth row in FPA 117 are successively read out from output terminal 108 over output line 121 and through on-chip output amplifier 107. The infrared signals read out from output terminal 108 are processed in a similar manner as in the conventional example, obviating a description of the process.

After the reading out of the signals of all m first bolometer detectors 101 disposed in the jth row is completed, vertical shift register 110 ends the selection of horizontal line 106 of the jth row and now selects the next j+1th row. The operation described is repeated n times. Consequently, all of the infrared signals of m×n first bolometer detectors 101 disposed in FPA 117 are detected.

A bridge circuit of the infrared focal plane array detector of the present invention will be described with reference to the drawings. FIGS. 3A to 3D are schematic circuit diagrams of bridge circuits for the infrared focal plane array detector of the present invention and each shows an example of a combination of the three kinds of bolometer detectors.

Figure 3A:
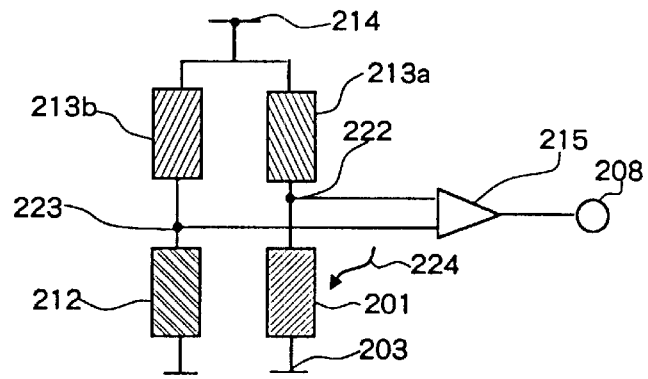
FIG. 3A is a schematic circuit diagram of abridge circuit of the infrared focal plane array detector of the present invention and an equivalent circuit regarding a given unit cell of the infrared focal plane array detector of a particular example according to the present invention shown in FIG. 2 for explaining that the unit cell forms a bridge circuit.

FIG. 3A is an equivalent circuit regarding an arbitrary unit cell of the infrared focal plane array detector of the present invention shown in FIG. 2 and illustrates that the unit cell forms a bridge circuit. In FIG. 3A, first bolometer detector 201 and third bolometer detector 213a, and second bolometer detector 212 and third bolometer detector 213b are individually connected in series between ground terminals 203 and power supply terminal 214 such that they form a bridge circuit, and two midpoint potentials, i.e., first midpoint 222 and second midpoint 223, are connected to a pair of input terminals of differential amplifier 215. Consequently, a potential difference between first midpoint 222 and second midpoint 223 appears at output terminal 208.

In the construction, because only heat energy originating from incoming infrared rays 224 incoming to first bolometer detector 201 may possibly become a factor which causes a displacement from a balance point of the bridge circuit, only an infrared signal appears at output terminal 208. Further, even if the temperature of the substrate varies, the two midpoint potentials, i.e., the voltages at first midpoint 222 and second midpoint 223, vary by the same amount in the same direction, and therefore, no temperature drift appears at output terminal 208.

If it is assumed that first bolometer detector 201 of FIG. 3A is first bolometer detector 101 at the address (i, j) in FPA 117 of FIG. 2, then the other bolometer detectors in FIG. 3A, i.e., second bolometer detector 212, third bolometer detector 213a and third bolometer detector 213b, correspond to second bolometer detector 112 in the jth row in first reference element region 118 shown in FIG. 2, third bolometer detector 113 in the ith column in second reference element region 119 and third bolometer detector 113 in third reference element region 120, respectively.

If it is tried to form a bridge circuit from the three kinds of bolometers of FIG. 2, i.e., first bolometer detector 101, second bolometer detector 112 and third bolometer detector 113, three different combinations are available. The three combinations are shown in FIGS. 3B to 3D.

Figure 3B:
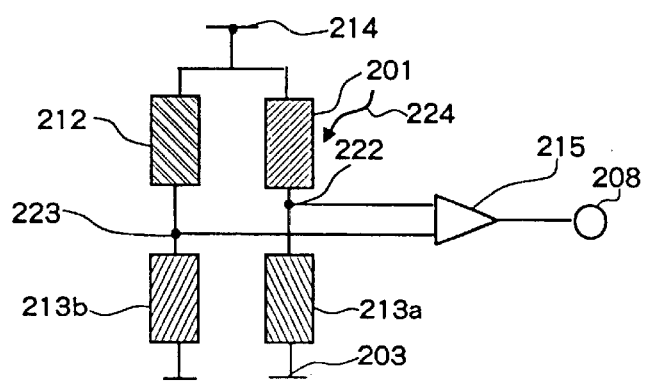
FIGS. 3B to 3D are schematic circuit diagrams of bridge circuits of the infrared focal plane array detector of the present invention corresponding to other embodiments.

In the circuit of FIG. 3B, the relationship between power supply terminal 214 and ground terminal 203 is reverse to that in FIG. 3A. Also with the circuit of the construction, only an infrared signal appears at output terminal 208 because only thermal energy originating from incoming infrared rays 224 incoming to first bolometer detector 201 may possibly become a factor which causes some displacement from a balance point of the bridge circuit. Further, even if the temperature of the substrate varies, no temperature drift appears at output terminal 208 because the two midpoint potentials, i.e., the voltages at first midpoint 222 and second midpoint 223, vary by the same amount in the same direction.

Figure 3C:
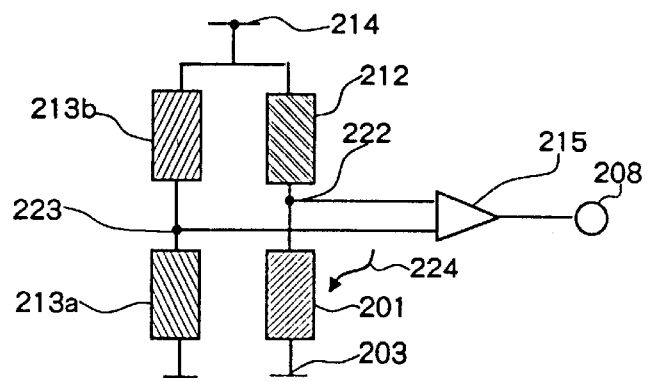
Figure 3D:
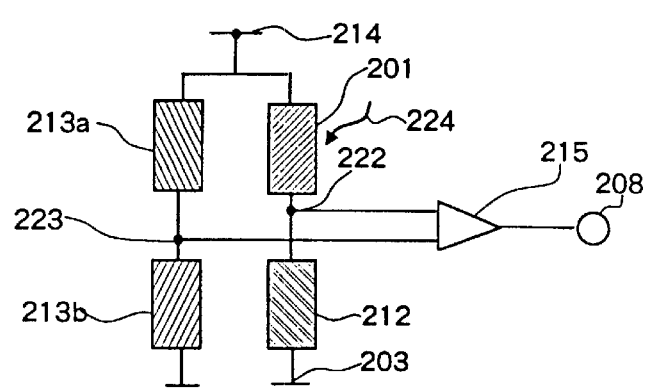

In the circuit of FIG. 3C, first bolometer detector 201 and second bolometer detector 212, and third bolometer detector 213a and third bolometer detector 213b are individually connected in series between ground terminals 203 and power supply terminal 214 such that they form a bridge circuit, and two midpoint potentials, i.e., first midpoint 222 and second midpoint 223, are connected to the input terminals of differential amplifier 215. Consequently, a potential difference between first midpoint 222 and second midpoint 223 appears at output terminal 208. In particular, third bolometer detectors 113 are disposed in first reference element region 118 of FIG. 2, and second bolometer detectors 112 are disposed in second reference element region 119.

In the construction, because only heat energy originating from incoming infrared rays 224 incoming to first bolometer detector 201 may possibly become a factor which causes some displacement from a balance point of the bridge circuit, only an infrared signal appears at output terminal 208. Further, even if the temperature of the substrate varies, the two midpoint potentials, i.e., the voltages at first midpoint 222 and second midpoint 223, vary by the same amount in the same direction, and therefore, no temperature drift appears at output terminal 208.

In the circuit of FIG. 3D, the relationship between power supply terminal 214 and ground terminal 203 is reverse to that in FIG. 3C. Also with the circuit of the construction, only an infrared signal appears at output terminal 208 because only thermal energy originating from incoming infrared rays 224 incoming to first bolometer detector 201 may possibly become a factor which causes some displacement from a balance point of the bridge circuit. Further, even if the temperature of the substrate varies, no temperature drift appears at output terminal 208 because the two midpoint potentials, i.e., the voltages at first midpoint 222 and second midpoint 223, vary by the same amount in the same direction.

While only the arrangement corresponding to FIG. 3A is shown in FIG. 2 of the present embodiment, also the arrangements corresponding to FIGS. 3B to 3D can be constructed readily by application of FIG. 2, and the circuit of the present invention can be carried out.

Figure 4A:
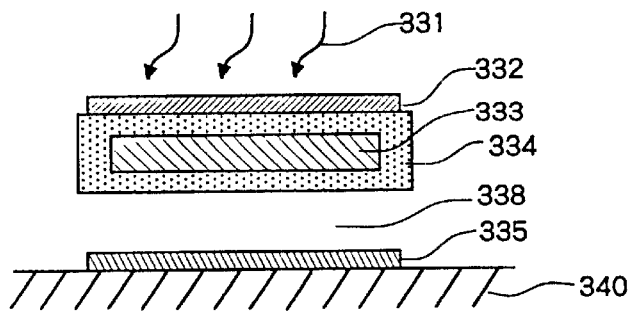
FIG. 4A is a schematic sectional view showing a structure of a first bolometer detector of the present invention.

Next, the structures of the bolometer detectors of the present invention will be described with reference to FIGS. 4A to 4D. FIG. 4A shows the structure of the first bolometer detector, and FIG. 4B shows the structure of the third bolometer detector while FIGS. 4C and 4D show the structures of the second bolometer detector.

In FIG. 4A, cavity 338 is provided in order to thermally isolate bolometer material 333 from substrate 340, and cavity 338 is kept in a vacuum state. Further, infrared ray absorption film 332 is provided on the infrared ray incoming side on bolometer material 333, and infrared reflection film 335 is provided on substrate 340. An interference effect of infrared ray absorption film 332 and infrared reflection film 335 is utilized to make absorption of infrared rays surer. Accordingly, with the unit cell of FIG. 4A, thermal energy of incoming infrared rays 331 is absorbed efficiently by infrared ray absorption film 332, and the absorbed heat is transmitted to bolometer material 333 covered with protective film 334. As a result, a temperature variation occurs with bolometer material 333 and the resistance value of bolometer material 333 varies. Accordingly, the unit cell of this type is used for first bolometer detectors 101 of FIG. 2.

Figure 4B:
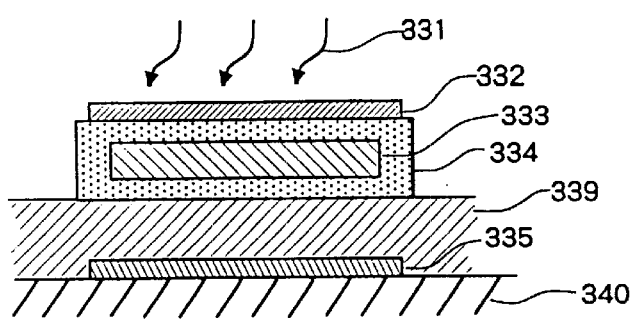
FIG. 4B is a schematic sectional view showing a structure of a third bolometer detector of the present invention.

In FIG. 4B, the structure of third bolometer detector 113 of FIG. 2 is shown. The difference of the bolometer detector of FIG. 4B from the bolometer detector of FIG. 4A resides in that it does not have cavity 338. Therefore, thermal energy of incoming infrared rays is diffused quickly to the substrate and little temperature variation occurs with the bolometer material. Since the resistance value and the temperature coefficient are the same electric characteristics as those of the first bolometer detector of FIG. 4A, the bolometer detector of FIG. 4B is used advantageously to obtain a reference voltage for a bridge circuit.

Figure 4C:
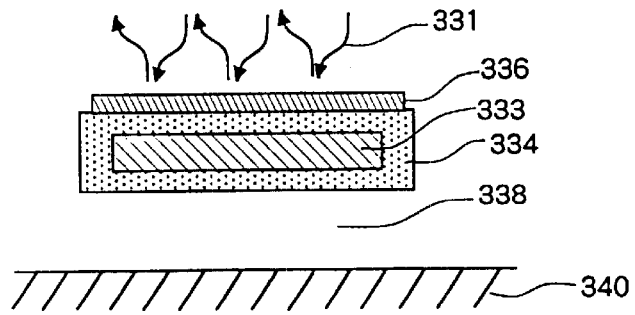
FIGS. 4C and 4D are schematic sectional views showing a structure of a second bolometer detector of the present invention.
Figure 4D:
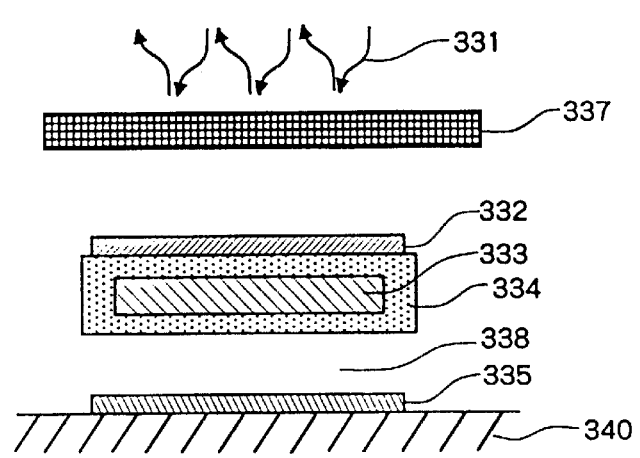

In FIGS. 4C and 4D, the bolometers shown have structures partially modified from the structure shown in FIG. 4A such that thermal energy of incident infrared rays may not be provided to the bolometer detector. To this end, the bolometer detector of FIG. 4C has infrared ray reflection film 336 on the infrared ray incoming face thereof while the bolometer detector of FIG. 4D has light interception plate 337 provided above bolometer material 333. Accordingly, the bolometer detectors of the structures of FIGS. 3C and 3D can be used as second bolometer detectors 112 shown in FIG. 2.

Next, a method of producing the infrared focal plane array detector according to the present invention will be described with reference to FIGS. 4A to 4D. The method of producing the infrared focal plane array detector according to the present invention includes a first step of forming unit cell selections witches for selectin bolomete[00f8] detectors 333, differential amplifiers (not shown) and other necessary elements on substrate 340, a second step of forming sacrificial layer 339 on the substrate, a third step of forming film 333 made of a bolometer material and protective film 334 on sacrificial layer 339 such that film 333 maybe held between protective film 334, a fourth step of etching film 333 made of the bolometer material into a predetermined shape and covering film 333 with protective film 334, a fifth step of forming infrared ray absorption film 332 or infrared ray reflection film 336 on the bolometer material and patterning the infrared absorption film 332 or infrared ray reflection film 336 into a predetermined shape, a sixth step of removing sacrificial layer 339 except that at a predetermined location including the third bolometer detectors to form cavity 338, and a seventh step of containing space 338 under a vacuum state. In this instance, in order to make the thermal characteristics and the electric characteristics uniform, the first bolometer detectors, second bolometer detectors and third bolometer detectors must be produced from the same material by the same process.

Since the infrared focal plane array detector according to the present invention is constructed in such a manner as described above, the following effects are anticipated.

The first effect resides in removal of offset components. Since only a net signal from which offset components arising from background radiation and joule heat generation are removed is extracted, a sufficiently high gain can be taken after the signal is detected.

The second effects resides in reduction of a temperature drift. This eliminates the necessity for FPN correction to be performed frequency during operation as with conventional infrared focal plane array detectors, and augments the operability of an infrared camera.

It is to be understood, however, that although the characteristics and advantages of the present invention have been set fort[0088] in the foregoing description, the disclosure is illustrative only, and changes may be made in the arrangement of the parts within the scope of the appended claims.

What is claimed is:

1. An infrared focal plane array detector wherein a plurality of bolometer detectors are arranged in a two-dimensional array forming columns and rows on a substrate, and each of said plurality of bolometer detectors is successively selected to detect an infrared ray incoming to its position said plurality of bolometer detectors comprising:

at least one first bolometer detector and at least one second bolometer detector and at least one third bolometer detector provided on said substrate, wherein said at least one first bolometer detector has, between said at least one first bolometer detector and said substrate, a thermal isolation structure, for thermally isolating said at least one first bolometer detector and said substrate from each other, said at least first bolometer detector being disposed in an infrared detection area on said substrate for receiving infrared rays incoming thereto;

said at least one second bolometer detector has a thermal isolation structure, between said at least one second bolometer detector and said substrate, for thermally isolating said at least one second bolometer detector from said substrate, said at least one second bolometer detector receiving no infrared rays incoming to said infrared focal plane array detector;

said at least one third bolometer detector is formed on said substrate without having a thermal isolation structure between said at least one third bolometer and said substrate; and said bolometer detectors forming a circuit for removing an offset in output signals therefrom and reducing a temperature drift thereof.

2. The infrared focal plane array detector according to claim 1, further comprising another third bolometer detector, wherein said at least one first bolometer detector is disposed in said infrared detection area, said at least one third bolometer detector is disposed on the same column as said at least one first bolometer detector, and said at least one first and said at least one third bolometer detectors are connected to each other at a first junction;

wherein said at least one second bolometer detector is disposed on the same row as said at least one first bolometer detector, said another third bolometer detector is disposed on the same column as said at least one second bolometer detector, and said second and said another third bolometer detectors are connected to each other at a second junction; and wherein a bridge circuit is formed from the four bolometer detectors, and said first junction and said second junction form midpoints for detecting a difference in voltage of said bridge circuit.

3. The infrared focal plane array detector according to claim 2, wherein said infrared focal plane array detector includes at least two second bolometer detectors and at least two switching elements, said at least two switching elements selectively using one of said at least two second bolometer detectors in said bridge circuit.

4. The infrared focal plan array detector according to claim 2, further including a switching transistor for selecting said at least one first bolometer detector and a differential amplifier for detecting said difference in voltage between said midpoints of said bridge circuit, wherein said switching transistor and said differential amplifier are formed on said substrate on which said bolometer detectors are formed.

5. The infrared focal plane array detector according to claim 1, further comprising another third bolometer detector, wherein said at least one first bolometer detector is disposed in said infrared detection area, said at least one second bolometer detector is disposed on the same column as said at least one first bolometer detector, and said at least one first bolometer detector and said at least one second bolometer detectors are connected to each other at a first junction;

wherein said at least one third bolometer detector is disposed on the same row as said at least one first bolometer detector, said another third bolometer detector is disposed on the same column as said at least one third bolometer detector, and said third and said another third bolometer detectors are connected to each other at a second junction; and wherein a bridge circuit is formed from the four bolometer detectors, and said first junction and said second junction form midpoints for detecting a difference in voltage of said bridge circuit.

6. The infrared focal plane array detector according to claim 5, wherein said infrared focal plane array detector includes at least two third bolometer detectors and at least two switching elements, said at least two switching elements selectively using one of said at least two third bolometer detectors in said bridge circuit.

7. The infrared focal plane array detector according to claim 5, further including a switching transistor for selecting said at least one first bolometer detector and a differential amplifier for detecting a potential difference between the midpoints of said bridge circuit, wherein said switching transistor and said differential amplifier are formed on said substrate on which said bolometer detectors are formed.

8. The infrared focal plane array detector according to claim 1, wherein an infrared ray interception layer is provided on an infrared ray incoming side of said at least one second bolometer detector.

9. The infrared focal plane array detector according to claim 1, wherein an infrared ray reflection film is provided on said at least one second bolometer detector on said substrate.

10. A method of producing an infrared focal plane array detector wherein a plurality of bolometer detectors are formed in a two-dimensional array on a substrate and said bolometers are successively selected to detect infrared rays incoming to positions of said bolometer detectors, said method of producing an infrared focal plane array detector comprising:

forming switching transistors for selecting said bolometer detectors on said substrate;

forming a sacrificial layer on said substrate;

forming a film made of a bolometer material and a protective film on said sacrificial layer such that said film is held between said protective film;

etching said film made of the bolometer material into a predetermined shape and covering said film with said protective film;

forming, in accordance with an application of said bolometer detectors, an infrared ray absorption film for a first bolometer detector and a third bolometer detector, and forming one of an infrared ray reflection film and a light interception film for a second bolometer detector on said protective film, and patterning said infrared absorption film, and one of said infrared reflection film and light interception film, into a predetermined shape;

removing said sacrificial layer, except at a predetermined location including said third bolometer detector, to form a space; and containing said space under a vacuum state.

11. The method of producing an infrared focal plane array detector according to claim 10, wherein three kinds of bolometer detectors including a plurality of first bolometer detectors having a thermal isolation structure between said first bolometer detectors and said substrate for thermally isolating said bolometer detectors and said substrate from each other and disposed in an infrared detection area on said substrate for receiving infrared rays incoming thereto, a plurality of second bolometer detectors formed on said substrate on which said first bolometer detectors are formed, said second bolometer detectors having a thermal isolation structure formed between said second bolometer detectors and said substrate for thermally isolating said second bolometer detectors from said substrate, said second bolometer detectors being structured to receive no infrared rays incoming to said infrared focal plane array detector, and a plurality of third bolometer detectors formed on said substrate on which said first bolometer detectors are formed and having no thermal isolation structure for isolating said third bolometer detectors from said substrate, said third bolometer detectors receiving the infrared rays incoming to said infrared focal plane array detector, are produced from the same material by the same process.

12. The method of producing an infrared focal plan array detector according to claim 11, further comprising forming a differential amplifier to which midpoint potentials of a bridge circuit formed from the three kinds of bolometer detectors are inputted.

13. An infrared focal plane array detector made by a method of producing an infrared focal plane array detector wherein a plurality of bolometer detectors are formed in a two-dimensional array on a substrate and said bolometers are successively selected to detect infrared rays incoming to positions of said bolometer detectors, said method of producing and infrared focal plane array detector comprising:

forming switching transistors for selecting said bolometer detectors on said substrate;

forming a sacrificial layer on said substrate;

forming a film made of a bolometer material and a protective film on said sacrificial layer, such that said film is held between said protective film;

etching said film made of the bolometer material into a predetermined shape and covering said film with said protective film;

forming, in accordance with an application of said bolometer detectors, an infrared ray absorption film for a first bolometer detector and a third bolometer detector, and forming one of an infrared ray reflection film and a light interception film for a second bolometer detector on said protective film and patterning said infrared absorption film, and one of said infrared reflection film and light interception film, into a predetermined shape;

removing said sacrificial layer, except at a predetermined location including said third bolometer detector, to form a space; and containing said space under a vacuum state.

14. An infrared focal plane array detector wherein a plurality of bolometer detectors are arranged in a two-dimensional array forming columns and rows on a substrate, and each of said plurality of bolometer detectors is successively selected to detect an infrared ray incoming to its position, said plurality of bolometer detectors comprising:

first bolometer detectors having a thermal isolation structure, between the first bolometer detectors and said substrate, for thermally isolating the first bolometer detectors and said substrate from each other, said first bolometer detectors being disposed in an infrared detection area on said substrate for receiving infrared rays;

second bolometer detectors having a thermal isolation structure between the second bolometer detectors and said substrate for thermally isolating the second bolometer detectors from said substrate, the second bolometer detectors receiving no infrared rays;

third bolometer detectors provided on said substrate; and fourth bolometer detectors provided on said substrate;

wherein one of the first bolometer detectors and one of the third bolometer detectors are disposed on the same column and connected to each other at a first junction;

one of the second bolometer detectors and said one of the first bolometer detectors are on the same row, and one of the fourth bolometer detectors and said one of the second bolometer detectors are disposed on the same column, and connected to each other at a second junction.

15. An infrared focal plane array detector wherein a plurality of bolometer detectors are arranged in a two-dimensional array forming columns and rows on a substrate, and each of said plurality of bolometer detectors is successively selected to detect an infrared ray incoming to its position, said plurality of bolometer detectors comprising:

first bolometer detectors having a thermal isolation structure, between the first bolometer detectors and said substrate, for thermally isolating the first bolometer detectors and said substrate from each other, the first bolometer being disposed in an infrared detection area on said substrate for receiving infrared rays;

second bolometer detectors having a thermal isolation structure between the second bolometer detectors and said substrate for thermally isolating the second bolometer detectors from said substrate, the second bolometer detectors receiving no infrared rays;

third bolometer detectors provided on said substrate; and fourth bolometer detectors provided on said substrate;

wherein one of the first bolometer detectors and said one of the second bolometer detectors are disposed on the same column and connected to each other at a first junction;

one of the third bolometer detectors and one of the first bolometer detectors are disposed on the same row; and said one of the third bolometer detectors and one of the fourth bolometer detectors are disposed on the same column and connected to each other at a second junction.

* * * * *

UNITED STATES PATENT AND TRADEMARK OFFICE
CERTIFICATE OF CORRECTION

PATENT NO.     : 6,441,372 B1
DATED          : August 27, 2002
INVENTOR(S)    : Akihiro Kawahara It is certified that error appears in the above-identified patent and that said Letters Patent is hereby corrected as shown below:

Column 1,
Line 45, delete "asubstrate" insert -- a substrate --

Column 4,
Line 42, delete "abridge" insert -- a bridge --

Column 5,
Line 43, delete "detecto [00f8]" insert -- detector --

Column 9,
Line 26, delete "selections witches for selectin bolomete [00f8}" insert -- selection switches for selecting bolometer --

Column 10,
Line 1, delete "fort [0088]" insert -- forth --

Signed and Sealed this

Eleventh Day of March, 2003

JAMES E. ROGAN
*Director of the United States Patent and Trademark Office*